Aug. 3, 1943.  W. H. BASELT ET AL  2,325,934
BRAKE ARRANGEMENT
Filed March 23, 1940   7 Sheets-Sheet 1
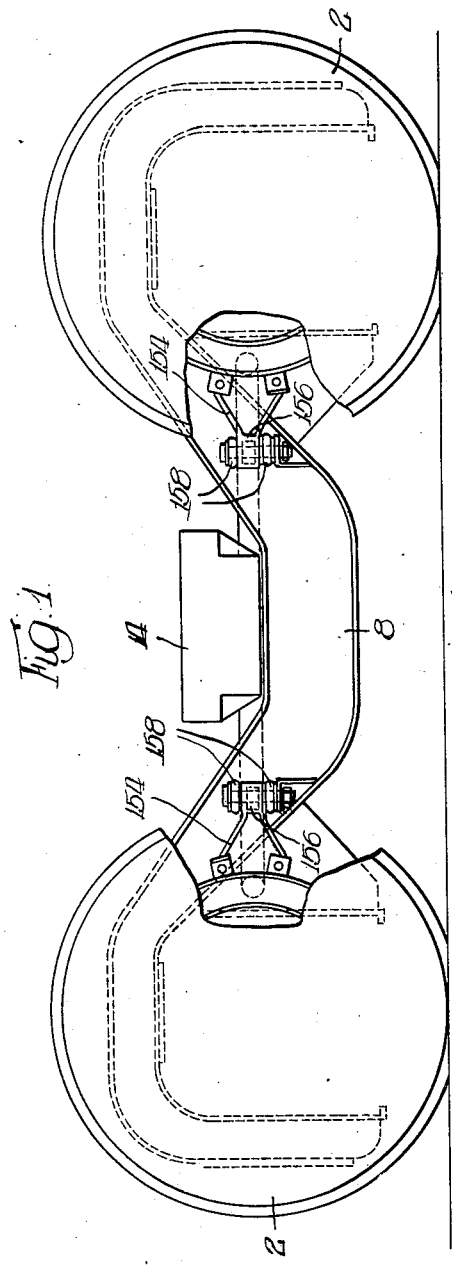
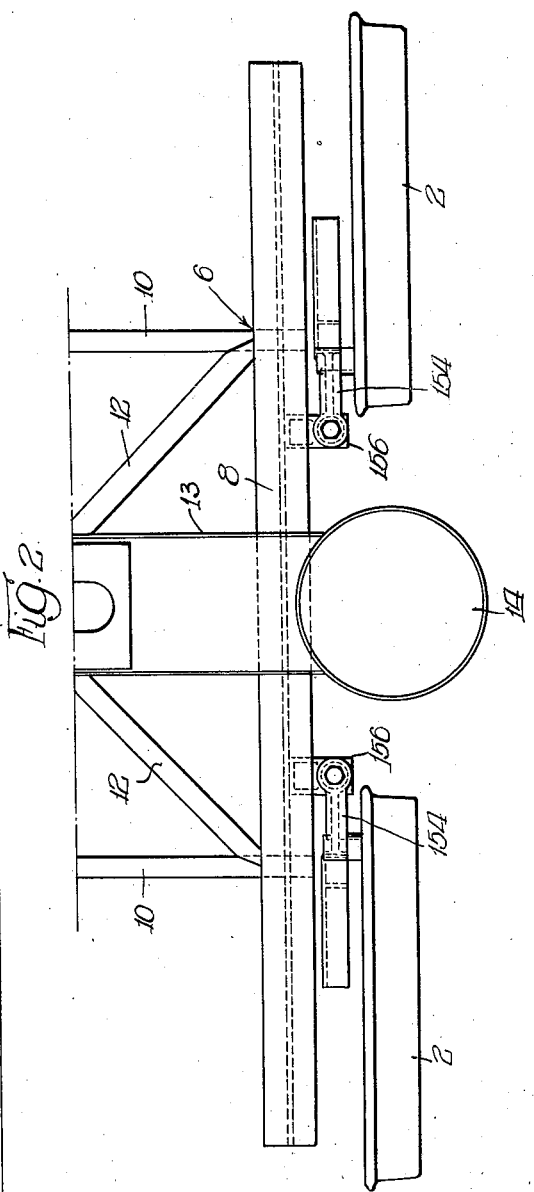
INVENTORS.
Walter H Baselt
Carl E. Tack,
BY
ATTORNEY.

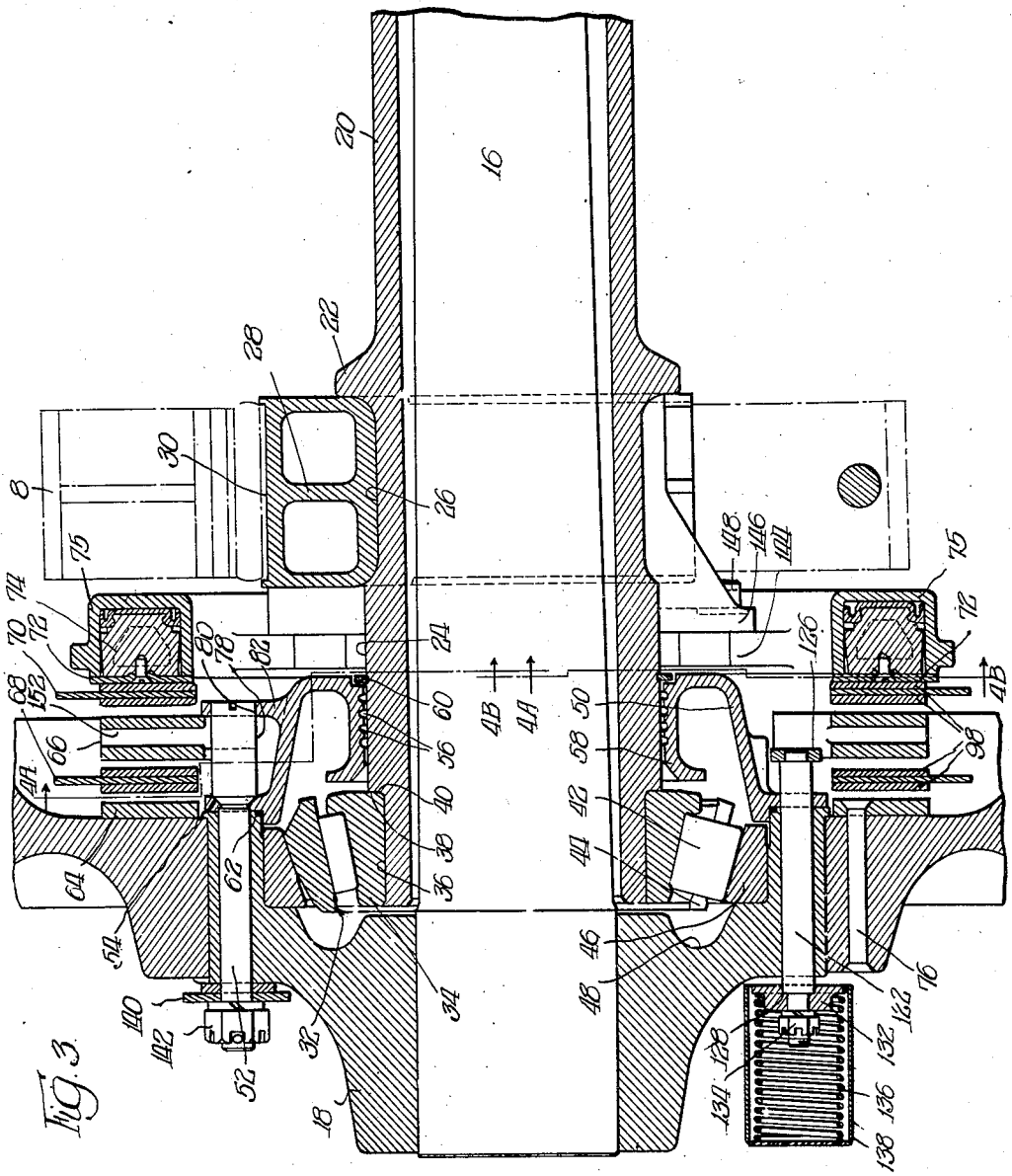

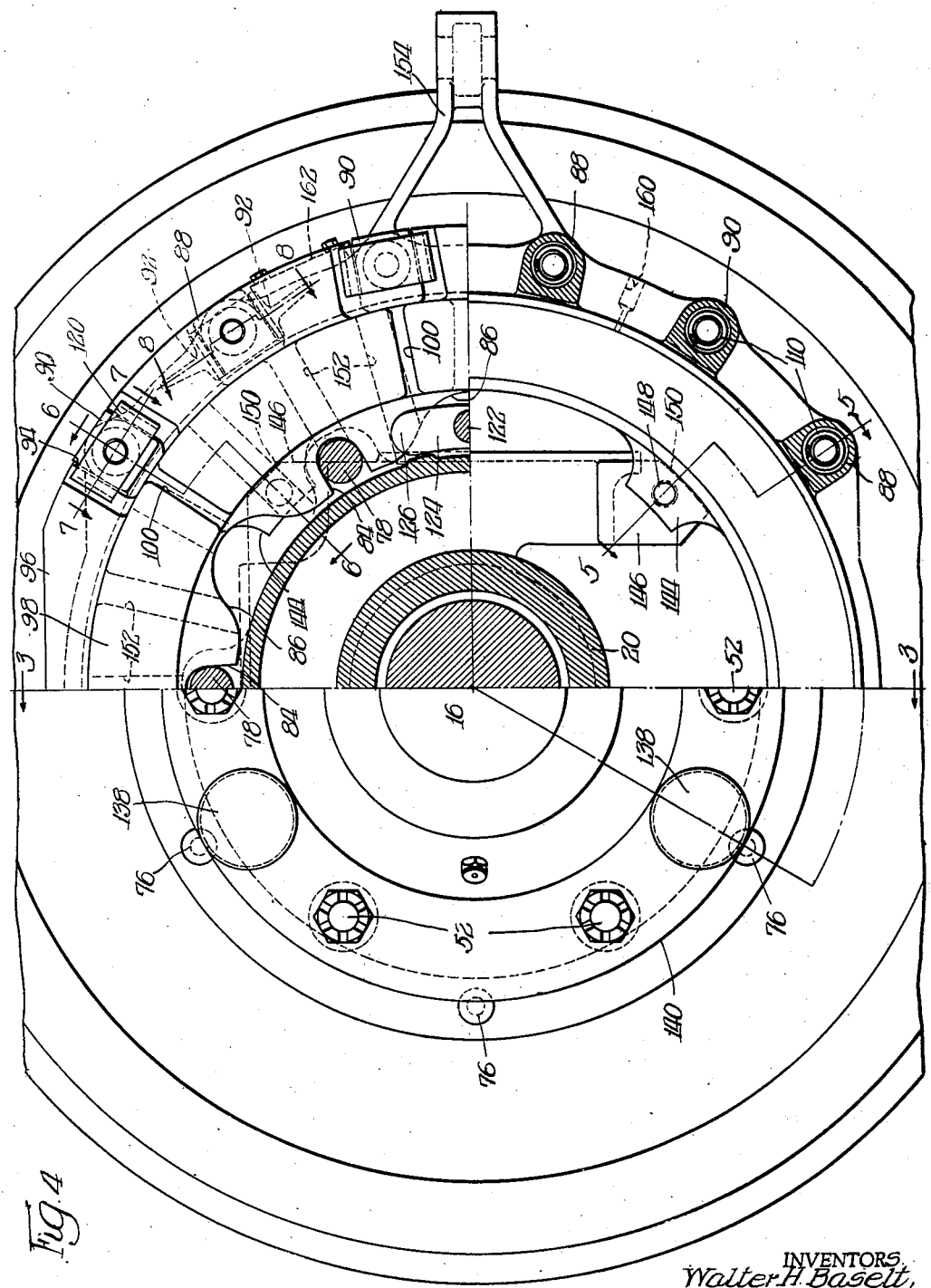

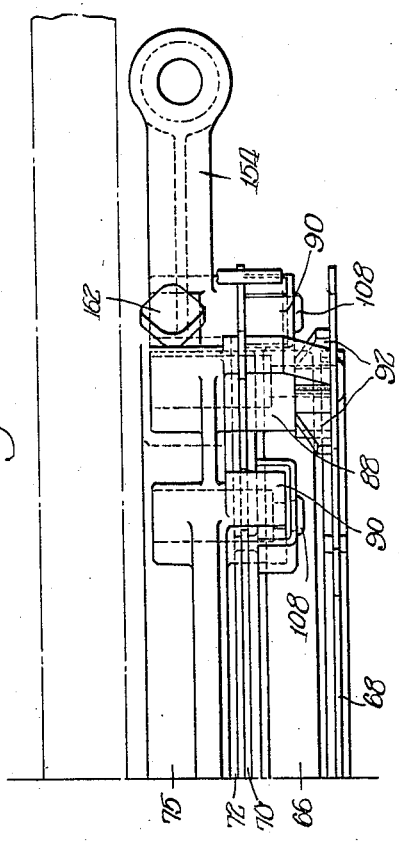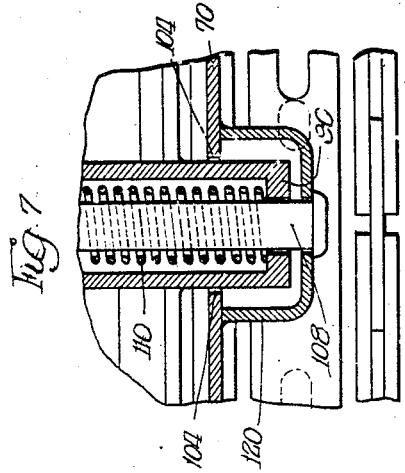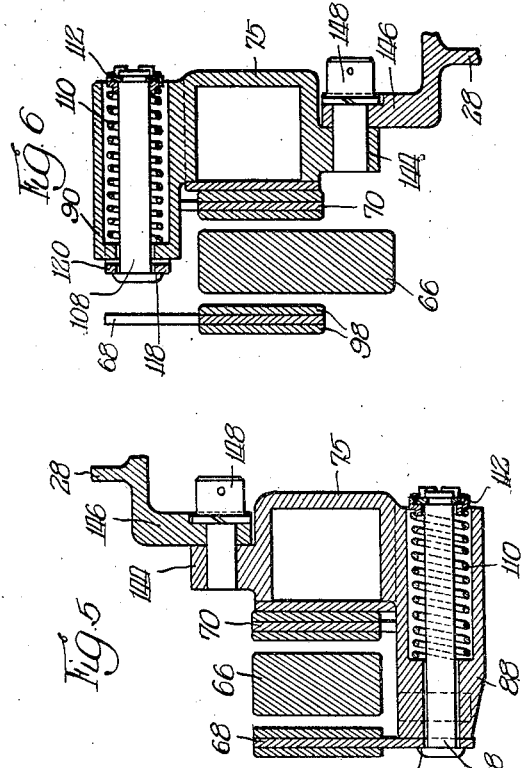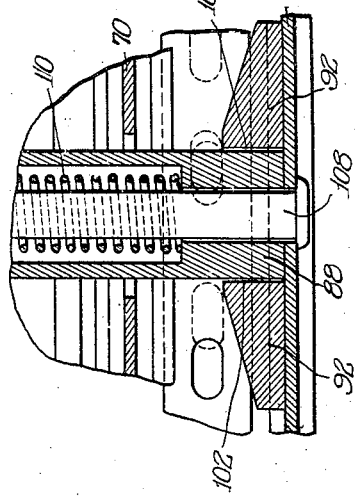

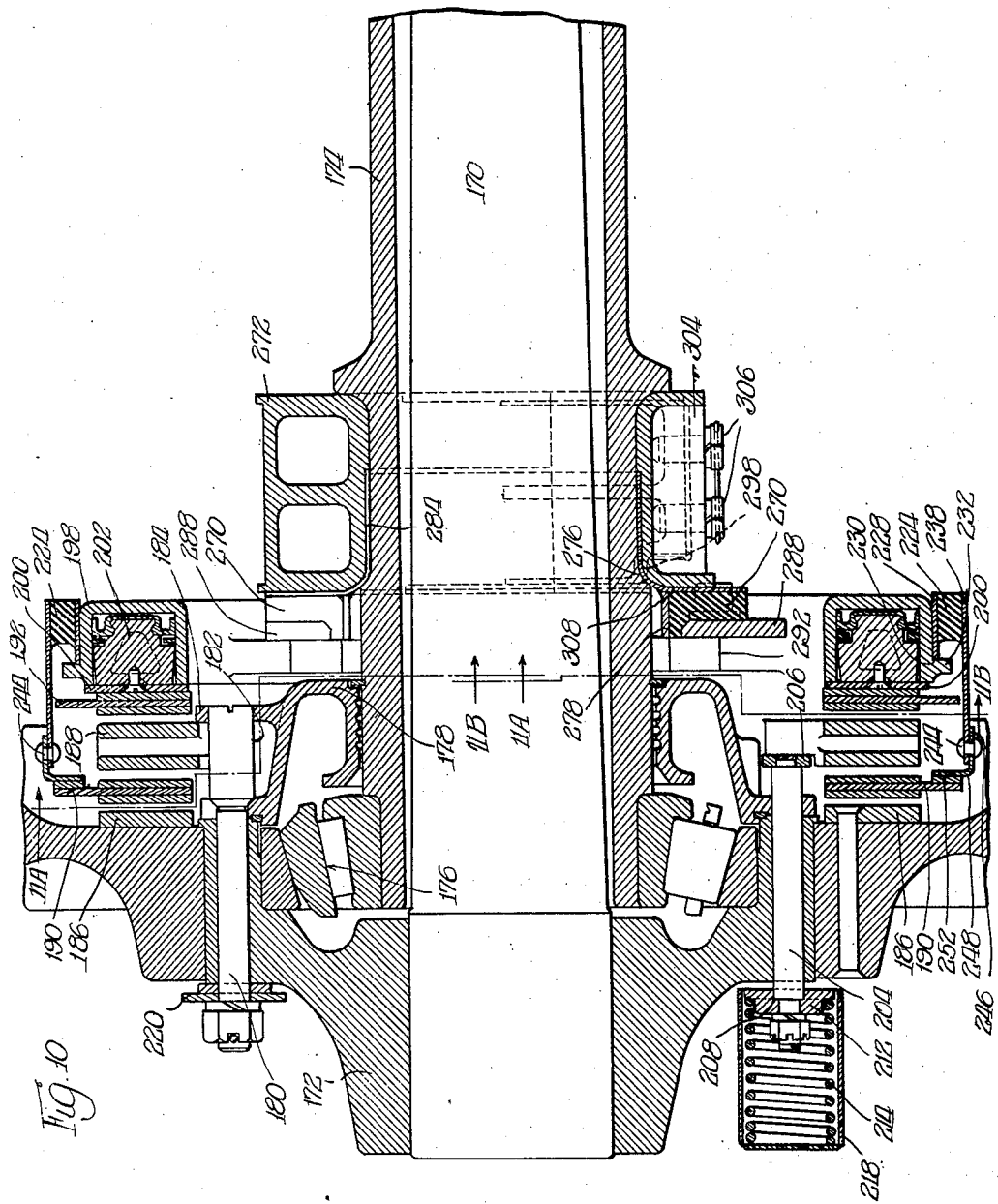

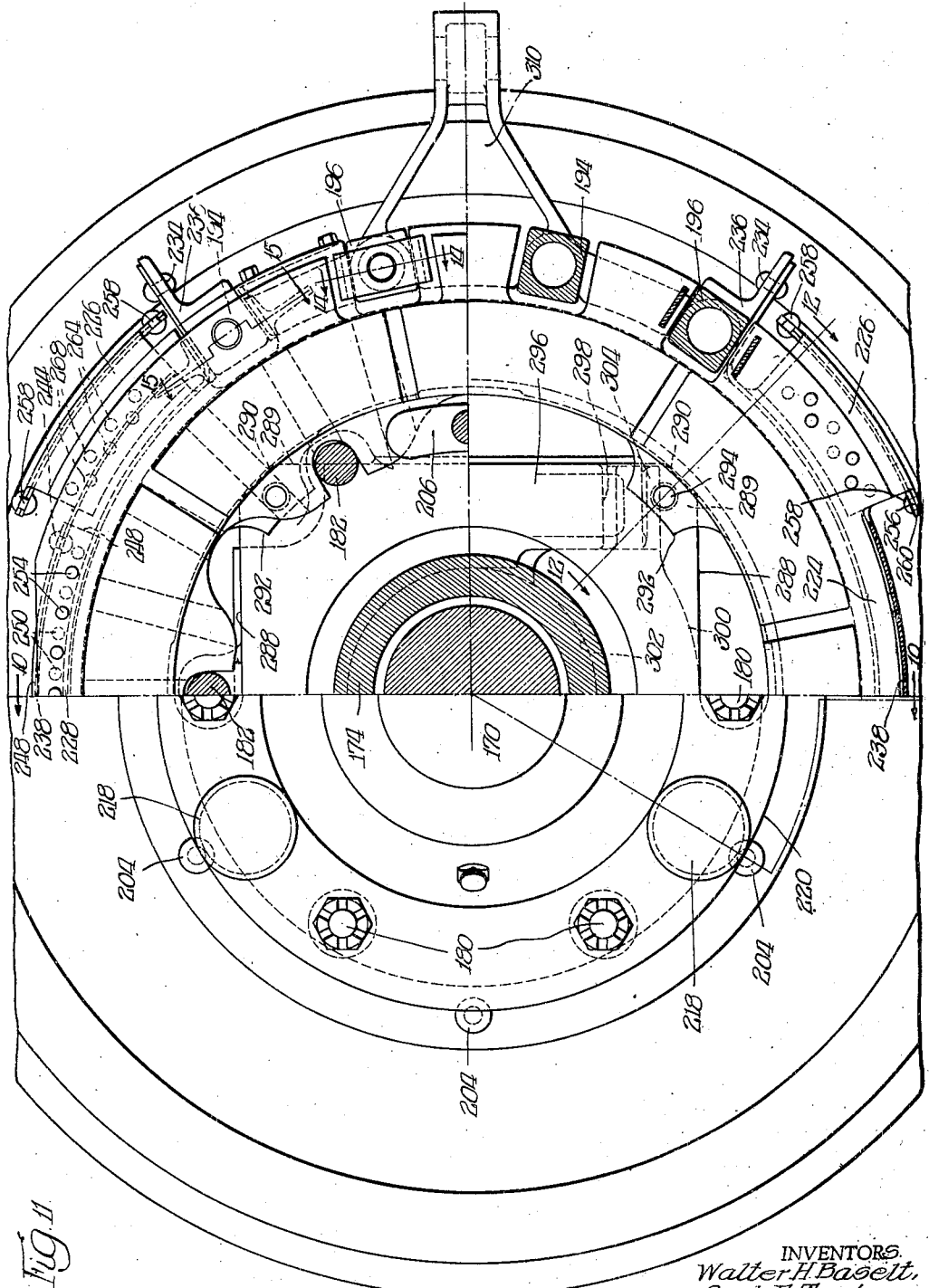

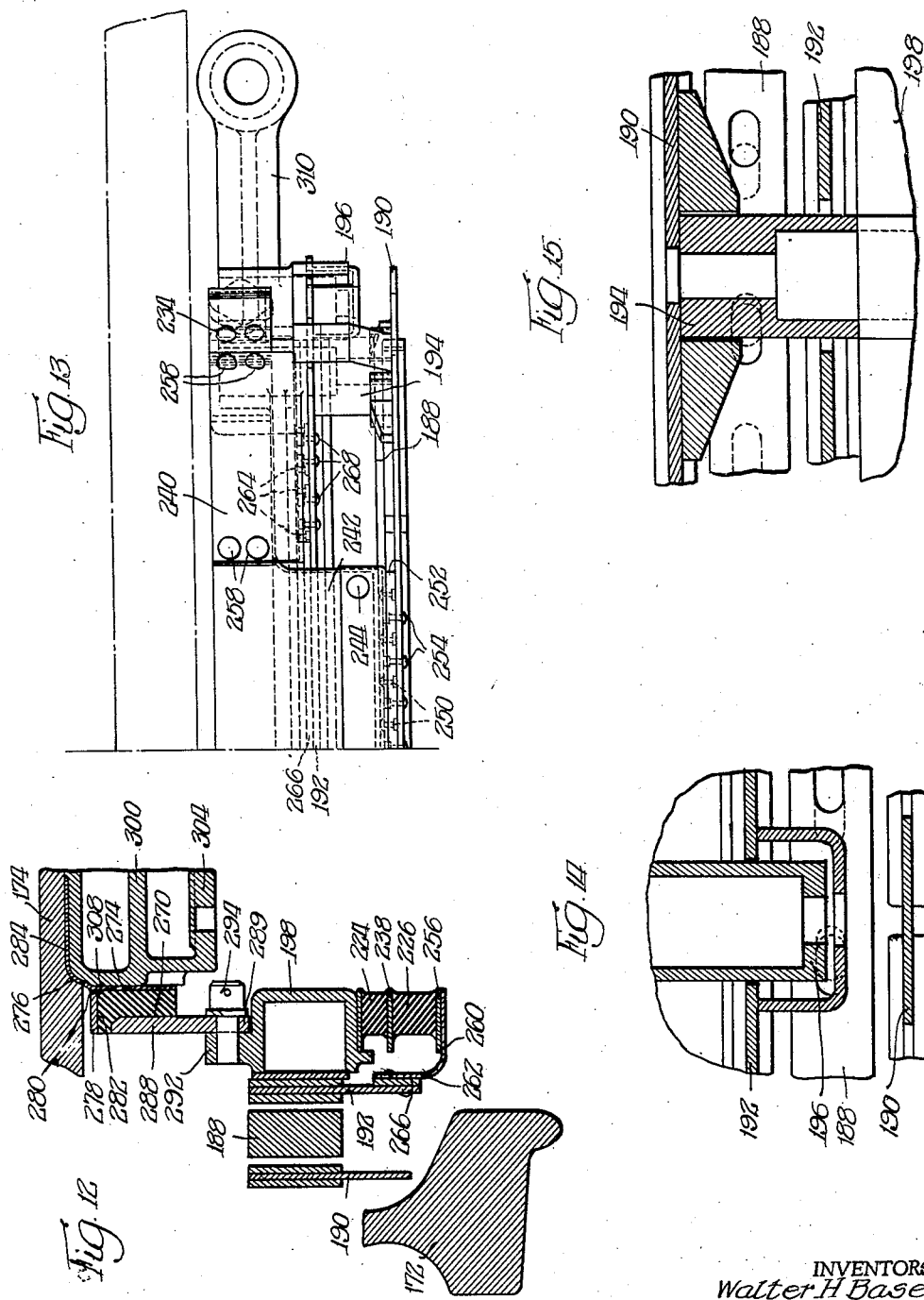

Patented Aug. 3, 1943

2,325,934

UNITED STATES PATENT OFFICE 2,325,934

BRAKE ARRANGEMENT

Walter H. Baselt and Carl E. Tack, Chicago, Ill., assignors to American Steel Foundries, Chicago, Ill., a corporation of New Jersey Application March 23, 1940, Serial No. 325,544

22 Claims. (Cl. 188—153)

Our invention relates to a railway brake arrangement and more particularly to a novel arrangement wherein braking elements of the disk type, commonly known as rotors and stators, may be supported and actuated inboard the wheels of a railway wheel and axle assembly.

An object of our invention is to provide such a disk brake wherein the rotors and stators may be compressed into a pile against an outboard rotor secured to the inboard face of the wheel by actuating means supported from inboard journal members of well-known type.

Our invention contemplates a disk brake which will conform to standard manufacturing requirements and which is of simple and compact construction so that it may be operated between the wheels and inboard journal members of a railway wheel and axle assembly.

A different object of our invention is to provide the stators of such a brake arrangement with novel release means comprising pads of resilient material mounted on the actuating means and having insulated connection to said stators.

Our invention further contemplates a rotor brake arrangement wherein the actuating means may be resiliently supported between the wheel and inboard journal member, said resilient support comprising pads of resilient material supported around the outer axle and compressed against said journal member.

Referring to the drawings, Figure 1 is a side elevation of a car truck embodying our invention, a fragment of the wheels being broken away to show our torque connection to the side frame, and Figure 2 is a top plan view thereof, only one-half of the truck structure being shown inasmuch as the other half is similarly arranged.

Figure 3 is a sectional view of one of the wheel and axle assemblies shown in Figure 1, the section being taken substantially in the plane indicated by line 3—3 of Figure 4.

Figure 4 is an end view, partly in section, of the structure shown in Figure 3, the upper right quarter section being taken substantially in the plane indicated by line 4A—4A of Figure 3 and the lower right quarter section being taken substantially in the plane indicated by line 4B—4B of Figure 3.

Figure 5 is a fragmentary sectional view taken substantially in the plane indicated by line 5—5 of Figure 4.

Figure 6 is a fragmentary sectional view taken substantially in the plane indicated by line 6—6 of Figure 4.

Figure 7 is a fragmentary sectional view, the section being taken substantially in the plane indicated by line 7—7 of Figure 4.

Figure 8 is a fragmentary sectional view, the section being taken substantially in the plane indicated by line 8—8 of Figure 4.

Figure 9 is a top plan view of the structure shown in the right half of Figure 4.

Figure 10 is a sectional view of a different modification of our invention, the section being taken substantially in the plane indicated by line 10—10 of Figure 11.

Figure 11 is a side elevation, partly in section, of the structure shown in Figure 10, the upper right quarter section being taken substantially in the plane indicated by line 11A—11A and the lower right quarter section being taken substantially in the plane indicated by line 11B—11B of Figure 10.

Figure 12 is a fragmentary sectional view, the section being taken substantially in the plane indicated by line 12—12 of Figure 11.

Figure 13 is a top plan view of the right half of the structure shown in Figure 11.

Figure 14 is a fragmentary sectional view, the section being taken substantially in the plane indicated by line 14—14 of Figure 11.

Figure 15 is a fragmentary sectional view, the section being taken substantially in the plane indicated by line 15—15 of Figure 11.

Describing our novel invention in greater detail and referring first to the modification shown in Figures 1 to 9, the wheel and axle assemblies 2, 2 support through journal members hereinafter described the truck frame generally indicated at 6, said frame comprising a longitudinal side member 8, transverse members 10, 10 diagonal members 12, 12, and an intermediate transverse member 13 affording a seat 14 intermediate the wheels for associated load supporting springs.

Each wheel and axle assembly 2 includes an inner rotating axle 16 (Figure 3) having a wheel 18 press-fitted on its outer end and having an outer nonrotating axle 20 sleeved thereover. Around said outer axle and adjacent its end may be formed the inboard shoulder 22 and the outboard shoulder 24 forming therebetween a seat 26 for the pedestal block or load carrying member 28, said pedestal block affording a seat as at 30 for the side member 8. Between the wheel and the end of the outer axle may be the anti-friction bearing generally indicated at 32 and which comprises an inner race or cup 34 press-fitted as at 36 on the end of the outer axle and having abutment against the outboard edge 38 of the shoulder 24 as at 40, the rollers 42, 42 held in spaced relationship by the cage 44, and the outer race or cup 46 press-fitted in the wheel 18. A lubricant cavity 48 may be afforded by the wheel 18 and the closure plate 50 which may be secured to the inboard face of said wheel by the rotor supporting bolts 52, 52, said bolts having a tapering shoulder 54 serving to tightly retain said closure plate. Escape of lubricant from the cavity 48 is prevented by the annular grooves 56, 56 formed in the inwardly directed flange 58 on said closure plate, the snap ring 60 which forms with said grooves a labyrinthine passage, and a gasket 62 inserted between the closure plate and the wheel.

The braking means may be supported inboard the wheel and comprises the outboard and inboard rotors 64 and 66, the outboard stator 68 positioned between said rotors, and the inboard stator 70 which has abutment against the insulator or gasket 72 secured to the face of the piston 74, said piston being operable in the ring cylinder 75.

The outboard rotor 64 may be secured to the inboard face of the wheel by countersunk rivets 76, 76 and the inboard rotor 66 may be supported from the elongated heads 78, 78 of the bolts 52, 52, said elongated heads having bearing as at 80 in the aligned spaced lugs 82, 82 formed around said closure plate. On the inner circumference of the inboard rotor 66 may be formed the spaced slots 84, 84 (Figure 4) cooperating with said elongated heads 78, 78 to afford axial movement of said rotor. Alternating with said slots 84, 84 may be the larger spaced slots 86, 86 providing convenient means for dismantling said rotor by rotating it, after the bolts 52, 52 have been withdrawn, until the slots 86, 86 are aligned with the lugs 82, 82 and then slipping said rotor over said lugs.

The stators 68 and 70 may be supported respectively from the outboardly directed lugs or studs 88, 88 and 90, 90 integrally formed on the outer circumference of the ring cylinder 75, the outboard stator 68 having T-shaped ribs 92, 92 (Figure 8) welded thereto on opposite sides of each of said studs 88, 88, and the inboard stator 70 (Figures 4 and 7) having rectangular slots 94, 94 formed in its outer circumference to receive the studs 90, 90. Each stator corresponds generally to the stator disclosed and described in the co-pending application Serial No. 306,709, now abandoned, filed in the United States Patent Office November 29, 1939 in the name of Carl E. Tack and entitled Brake element, and briefly comprises a circular flexible disk 96 (Figure 4) having metal pads 98, 98 fused thereto on its opposite sides with spaced slots 100, 100 formed between said pads to permit expansion thereof and to afford a passageway for a cooling medium, such as air. Torque of the outboard stator 68 is taken by abutment as at 102, 102 (Figure 8) of the T-shaped ribs 92, 92 against said stud 88, and torque of the inboard stator 70 is taken as by abutment as at 104, 104 (Figure 7) of the edges of the rectangular slots 94, 94 against the studs 90, 90.

Release means for said stators may be provided by the release or plunger pins 108, 108 (Figures 5 and 6) operable in each of said studs and having sleeved thereover the compression springs 110, 110 which may be seated on the retainers 112, 112. Each pin associated with the outboard stator 68 has its head in abutment against said stator as at 116 and each pin associated with the inboard stator 70 has its head in abutment as at 118 against a U-shaped strap 120 welded to said inboard stator, thus providing independent release means for each of said stators.

Release means for the rotor 66 may be provided by the bolts 122, 122 (Figure 3) passing through the wheel 18, each bolt having a T head 124 which serves to bridge the slots 86, 86 for abutment against said rotor as at 126 and having at its opposite end a shoulder 128 in abutment against the spring cap 132 which may be retained on said shoulder by the nut 134 in threaded engagement with said bolt. Each spring cap 132 affords a seat for a compression spring 136 which may be enclosed within a release spring housing 138, said housing being welded to a ring 140 secured outboard the wheel by the nuts 142, 142 threaded on said rotor supporting bolts 52, 52.

The ring cylinder 75 may be supported from the pedestal block 28 through spaced lugs 144, 144 (Figures 4 and 5) integrally formed on the inner perimeter of said ring cylinder in alignment with the ears or lugs 146, 146 formed on said pedestal block and secured thereto by the cap screws 148, 148. The outer edges 150, 150 of said ears 146, 146 are finished to provide precise and accurate mounting of said cylinder on said pedestal block. Passageway for a cooling medium, such as air, is provided through said slots 86, 86 and radial slots 152, 152 formed in said rotor 66. A torque arm 154 may be formed integrally with the ring cylinder 75 and may be connected to a bracket 156 on the side member 8, said torque arm being resiliently connected as at 158, 158 (Figure 1).

Inlets 160, 160 (Figure 4) for an actuating medium such as air may be afforded in said ring cylinder, and each may be provided with a flange cover 162 when the other inlet is being used.

In operation, the piston 74 urges the inboard stator 70, the rotor 66, and the outboard stator 68 into a compact pile against the outboard rotor 64 for frictional engagement. On release of the power means, said stators and rotors return to their normal positions by the independent release means heretofore described.

The modification shown in Figures 10 to 15 differs from the aforedescribed modification in that novel support and release means of resilient material are afforded for each of the stators and the actuating means is provided with resilient mounting on the outer axle. The braking arrangement corresponds generally to that already shown and each wheel and axle assembly comprises an inner rotating axle 170 (Figure 10) having a wheel 172 press-fitted on its outer end and having an outer nonrotating axle 174 sleeved thereover. Between said outer axle and the wheel 172 may be the antifriction bearing generally indicated at 176, said antifriction bearing having a closure plate 178 secured to the wheel by the spaced rotor supporting bolts 180, 180 which have elongated heads 182, 182 bearing in aligned lugs 184, 184 spaced on said closure plate.

The braking means may be supported inboard the wheel and comprises an outer rotor 186 secured to said wheel, an inboard rotor 188 supported from said elongated heads 182, 182 and the outboard and inboard stators 190 and 192 interleaved with said rotors and held against rotation by abutment against outwardly directed studs 194, 194 and 196, 196 respectively (Figures 15 and 14) which are integrally formed on the ring cylinder 198. Said stators correspond generally to the stator shown and described in the co-pending application Serial No. 306,709, now abandoned, filed in the United States Patent Office November 29, 1939, in the name of Carl E. Tack and entitled Brake element. The inboard stator 192 has abutment against the annular insulator or gasket 200 secured to the ring piston 202 which operates within said cylinder 198 and which urges said stators and rotors into a compact pile against the outboard rotor for frictional engagement on operation.

Release means for the inboard rotor 188 may be provided by spaced bolts 204, 204, each having a T head 206, 206 in abutment against said rotor and having a shoulder 208, 208 on its opposite end in abutment against the spring cap 212 which affords a seat for the compression spring 214. Said spring may be enclosed within a housing 218 welded to the ring 220 which is secured outboard said wheel.

Novel support and release means for the stators 190 and 192 may be provided as by mounting arcuate pads 224, 224 (Figure 10) and 226, 226 (Figure 12) of resilient material, such as rubber, on the outer circumference of said ring cylinder above and below said outer axle, said pads 224, 224 affording release means for the outboard stator 190, and pads 226, 226 seated on opposite ends of said pads 224, 224 providing release means for the inboard stator 192.

On the radially inner surface of each pad 224 (Figure 10) may be secured in any suitable manner, as by vulcanizing, the plate 228 which is seated on the outer circumference of said cylinder with its inner edge in abutment as at 230 against the radial reinforcing flange 232 on the outer circumference of said cylinder to afford positioning means therefor. Each end of said strap is bent radially outward adjacent said studs 194, 194 and 196, 196 (Figure 11) for riveting as at 234 to the angles 236, 236 which may be secured to the upper surface of said studs and which afford securing means for said resilient release means. Vulcanized to the radially outer surface of each pad 224 may be a metal plate 238, said plate having narrow end portions 240, 240 (Figure 13) and having a widened intermediate portion 242 extending over the stator 192 and the rotor 188 for connection to the outboard stator 190. The outboard end of said widened portion 242 may be secured as by rivets 244 (Figures 10 and 13) to the flange 246 of the member 248, said member being secured to the outer circumference of the inboard stator by means of spaced riveting as at 250 to the insulating material 252 which is secured to the stator by the spaced rivets 254, 254, said riveting being arranged in such manner as to reduce the transmission of heat from said stator through the rivets to the metal plate.

The resilient pads 226, 226 may be secured to said end portions 240, 240 as by vulcanizing, each pad having secured to its radially outer surface a metal plate 256 (Figure 12) which projects beyond each end of said pads for riveting as at 258 to the plate 260. Said plate 260 has a radially inwardly directed flange 262 connected to said inboard stator by means of riveting as at 264, 264 to the insulating material 266 which is secured to the stator by the spaced rivets 268, 268, said riveting being spaced in such a manner that heat conduction will be reduced to a minimum during operation. As the stators move inwardly by operation of the piston, the resilient pads are placed in shear and on release of the power means said pads return said stators to their normal released positions.

The ring cylinder 198 may be resiliently supported around the outer axle by means of semi-circular annular pads 270, 270 of resilient material, such as rubber, mounted between the pedestal block or load carrying member 272 and the closure plate 178. Each of said pads may be secured in any convenient manner as by vulcanizing to the radial flange 274 (Figure 12) of a semi-cylindrical member 276 and a semi-annular ring 278 which may be welded as at 280 to said flange and which affords a seat for said pad as at 282. Said semi-cylindrical members 276, 276 may be tightly retained between said pedestal block and said outer axle as at 284, a portion of the inner circumferential area of said block being relieved to afford space therefor. Seated on each of said pads 270, 270 and secured to their outboard surfaces as by vulcanizing may be the substantially rectangular shaped members 286, 286, said members when assembled forming substantially a square, the corners 288, 288 of said square being finished at 290, 290 to provide precise and accurate seating of said cylinder on said members 286, 286. Spaced lugs 292, 292 may be integrally formed on the inner circumference of said ring cylinder in alignment with said finished corners and secured thereto as by cap screws 294, 294 (Figure 12). Adjacent the bottom of the legs 296, 296 of said pedestal block, the outboard faces of said legs may be offset as at 298 to provide convenient access to said cap screws.

Beneath said outer axle and between said pedestal legs 296, 296 may be inserted the pedestal tie block 300 (Figure 12) having an arcuate surface 302 (Figure 11) complementary to said outer axle and having the flanges 304, 304 on opposite sides thereof affording means for securing said tie blocks to said pedestal legs as by the cap screws 306, 306. The reaction of said cylinder may be cushioned by said resilient pads 270, 270 and may be taken as by abutment of said cylinder support members 276, 276 against the outboard faces of said pedestal block and pedestal tie block 300 as at 308. A torque arm 310 may be integrally formed with said cylinder and may be resiliently connected to a bracket on a frame member as in the previous modification.

In operation, the piston compresses said rotors and stators into a compact pile against the outboard rotor for frictional engagement. Upon release of the power means, my novel release means of resilient material return said stators to their normal released positions.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. In a railway car truck, a frame, a supporting wheel and axle assembly comprising a rotating axle with a wheel seated thereon, a nonrotating axle sleeved over said rotating axle, antifriction bearings between said wheel and said nonrotating axle, a closure plate for said bearings, an inboard journal member, braking means and actuating means operable between said wheel and journal member, said braking means including rotatable elements driven by said wheel and closure plate and stationary elements supported from said actuating means, and release means for said stators comprising spaced pads of resilient material mounted on said actuating means.

2. In a car truck, a frame, a supporting wheel and axle assembly comprising a rotating axle having a wheel thereon, a nonrotating axle around said rotating axle, antifriction bearings between said wheel and said nonrotating axle, a closure plate, an inboard journal member, actuating means supported from said journal member, braking means operable between said wheel and said journal member and including stators supported from said actuating means and rotors supported from said wheel and closure plate, said actuating means being operable to move said rotors and stators into a compact pile for frictional engagement.

3. In a railway braking arrangement, a frame, an inner rotating axle having a wheel thereon, an outer nonrotating axle around said rotating axle, antifriction bearings between said wheel and said nonrotating axle, an inboard journal member, power means resiliently supported from said nonrotating axle between said wheel and said journal member, braking means operable between said wheel and said power means and comprising interleaved rotors and stators supported respectively from said wheel and said power means, said power means being operable to urge said rotors and stators into frictional engagement.

4. In a railway braking arrangement, a frame, a supporting wheel and axle assembly comprising an inner axle having a wheel thereon, an outer axle sleeved over said inner axle, an inboard journal member, antifriction bearings between said wheel and said outer axle, a closure plate, resilient means secured around said outer axle adjacent said journal member, actuating means supported from said resilient means between said wheel and said journal member, rotors supported from said wheel and said closure plate, stators supported from said actuating means, and resilient pads on said actuating means affording release means for said stators.

5. In a brake arrangement for a railway car truck, a frame, supporting wheel and axle assemblies, pedestal blocks inboard said wheels affording seats for said frame, braking means between each wheel and the adjacent block comprising interleaved rotors and stators, said rotors being supported from said wheel, power means supported on said block around the axle, said stators being supported from said power means and said power means being operable to move said stators and rotors into engagement with each other, and a torque connection between said frame and said power means.

6. In a brake arrangement for a railway car truck, a wheel and axle assembly, a frame supporting member seated on said axle inboard said wheel, braking means supported between said wheel and said member comprising interleaved rotors and stators supported respectively from said wheel and said member, said braking means comprising a ring cylinder secured to said member concentric with said axle, and resilient means mounted on said cylinder and operable to support said stators concentric with said axle.

7. In a brake arrangement for a railway car truck, a wheel and axle assembly, a frame supporting member seated on said axle inboard said wheel, braking means supported between said wheel and said member comprising interleaved rotors and stators supported respectively from said wheel and said member, said braking means comprising a ring cylinder secured to said member concentric with said axle, and resilient means mounted on said cylinder and operable to return said stators to released position after actuation.

8. In a brake arrangement, a wheel and axle assembly, a frame supported on said assembly inboard said wheel, braking means comprising interleaved rotors and stators supported around said axle between said wheel and frame, operating means for said braking means in the form of a ring cylinder supported concentric with said axle, and release means for said rotors and stators supported respectively from said wheel and said power means, said stator release means being also operative to resiliently support said stators concentric with said axle.

9. In a brake arrangement, a wheel and axle assembly, a frame supporting member on said assembly inboard said wheel, a frame supported thereon, and braking means in the form of rotors and stators between said wheel and said member and supported respectively therefrom, said braking means comprising power means mounted on said member operable to actuate said rotors and stators, and stator support and release means mounted on said power means, said stator release means being independently operative for respective stators.

10. In a brake arrangement, a wheel and axle assembly, a frame supporting member on said assembly inboard said wheel, a frame supported thereon, braking means in the form of rotors and stators between said wheel and said member and supported respectively therefrom, said braking means comprising a ring cylinder supported from said member concentric with said axle, and resilient means supported on said ring cylinder at spaced points, said resilient means being operative to support said stators concentric with said axle.

11. In a brake arrangement, a wheel and axle assembly, a frame supporting member on said assembly inboard said wheel, a frame supported thereon, and braking means in the form of rotors and stators between said wheel and said member and supported respectively therefrom, said braking means comprising power means supported concentric of said axle, a torque connection between said power means and said frame, and resilient members carried at spaced points on said power means, said resilient members affording support and release means for said stators.

12. In a brake arrangement, a wheel and axle assembly, a frame supporting member carried on said axle inboard said wheel, rotors and stators interleaved between said wheel and said member and supported therefrom respectively, power means mounted on said member concentric with said axle and operable to move said rotors and stators into braking engagement, and support and release means carried respectively on said wheel and said power means for said rotors and stators.

13. In a brake arrangement, a wheel and axle assembly, a frame supported on said assembly inboard said wheel, braking means comprising interleaved rotors and stators supported around said axle between said wheel and frame, operating means for said braking means in the form of a ring cylinder supported concentric with said axle, and release means for said rotors and stators supported respectively from said wheel and said power means.

14. In a brake arrangement for a railway car truck, a frame, supporting wheel and axle assemblies, pedestal blocks inboard said wheels affording seats for said frame, and braking means between each wheel and the adjacent block comprising interleaved rotors and stators, said rotors being supported from said wheel, power means supported on said block around the axle, said stators being supported from said power means and said power means being operable to move said stators and rotors into engagement with each other.

15. In a brake arrangement, a wheel and axle assembly, a frame supporting member on said assembly inboard said wheel, a frame supported thereon, and braking means in the form of rotors and stators between said wheel and said member and supported respectively therefrom, said braking means comprising power means mounted on said member operable to actuate said rotors and stators, and stator support and release means mounted on said power means.

16. In a brake arrangement, a wheel and axle assembly, a frame supporting member on said assembly inboard said wheel, a frame supported thereon, and braking means in the form of rotors and stators between said wheel and said member and supported respectively therefrom, said braking means comprising a ring cylinder resiliently supported from said member concentric with said axle.

17. In a brake arrangement, a wheel and axle assembly, a frame supporting member on said assembly inboard said wheel, a frame supported thereon, and braking means in the form of rotors and stators between said wheel and said member and supported respectively therefrom, said braking means comprising power means supported concentric of said axle, and a cushioned torque connection between said power means and said frame.

18. In a brake arrangement, a wheel and axle assembly, a frame supporting member on said assembly inboard said wheel, a frame supported thereon, and braking means in the form of rotors and stators between said wheel and said member and supported respectively therefrom, said braking means comprising power means resiliently supported from said member, and a torque connection between said power means and said frame.

19. In a brake arrangement, a wheel and axle assembly, a frame supporting member on said assembly, a frame supported thereon, and braking means in the form of rotors and stators between said wheel and said member and supported respectively therefrom, said braking means comprising power means resiliently mounted on said member operable to actuate said rotors and stators, and stator support and release means mounted on said power means.

20. In a brake arrangement, a wheel and axle assembly, a frame supporting member on said assembly, a frame supported thereon, and braking means in the form of rotors and stators between said wheel and said member and supported respectively therefrom, said braking means comprising power means mounted on said member operable to actuate said rotors and stators, and stator support means including resilient pads mounted on said power means.

21. In a brake arrangement, a wheel and axle assembly, a frame supporting member on said assembly, a frame supported thereon, and braking means in the form of rotors and stators between said wheel and said member and supported respectively therefrom, said braking means comprising power means resiliently mounted on said member operable to actuate said rotors and stators, and stator support and release means including resilient pads mounted on said power means.

22. In a vehicle, a frame, a supporting wheel and axle assembly including an inner rotatable axle with a wheel thereon, an outer non-rotating axle having a frame supporting member thereon, braking means between said wheel and said member including rotors driven by said wheel and stators interleaved with said rotors, annular power means resiliently carried on said member concentric with said axles for actuating said brake means, and stator support means on said power means.

WALTER H. BASELT.
CARL E. TACK.